United States Patent
Van Dijk

[11] Patent Number: 5,847,797
[45] Date of Patent: Dec. 8, 1998

[54] DISPLAY DEVICE

[75] Inventor: Antonius J. M. Van Dijk, Eindhoven, Netherlands

[73] Assignee: Flat Panel Display Co. (FPD) B.V., Eindhoven, Netherlands

[21] Appl. No.: 832,737

[22] Filed: Apr. 4, 1997

[30] Foreign Application Priority Data

Apr. 18, 1996 [EP] European Pat. Off. .............. 96201044

[51] Int. Cl.⁶ ........................ G02F 1/1333; G02F 1/1345
[52] U.S. Cl. ............................................ 344/158; 349/149
[58] Field of Search .................................. 349/158, 143, 349/149

[56] References Cited

U.S. PATENT DOCUMENTS

| | | | |
|---|---|---|---|
| 4,679,043 | 7/1987 | Morokawa | 349/158 |
| 5,103,328 | 4/1992 | Numao | 349/143 |
| 5,323,254 | 6/1994 | Pitt | 359/60 |
| 5,365,356 | 11/1994 | McFadden | 349/158 |
| 5,537,235 | 7/1996 | Ishihara et al. | 349/158 |
| 5,619,358 | 4/1997 | Tanaka et al. | 349/143 |

FOREIGN PATENT DOCUMENTS

| | | | |
|---|---|---|---|
| 59-116723 | 7/1984 | Japan | 349/149 |
| 59-184326 | 10/1984 | Japan | 349/149 |
| 60-216332 | 10/1985 | Japan | 349/149 |

*Primary Examiner*—William L. Sikes
*Assistant Examiner*—Tsep H. Nguyen
*Attorney, Agent, or Firm*—John C. Fox

[57] ABSTRACT

The display device comprises a first and a second substrate (52, 53) between which a number of pixels arranged in rows and columns are situated, and said first substrate (52) being provided with a group of electrodes (56, 56', 56") and said second substrate (53) being provided with a group of electrodes (57, 57', 57") for driving the pixels. The display device is characterized in that electrodes of the group of electrodes (56, 56', 56") extend as far as an edge (a) of the first substrate (52), and that the edge (a) of the first substrate (52) and a corresponding edge (a') of a second substrate (53) are positioned relative to each other such that the corresponding edge (a') projects a distance $d_1$ beyond the edge (b) of the first substrate (52). If electrodes of a further group of electrodes (57, 57', 57") extend as far as a further edge (b') of the second substrate (53), said further edge (b') of the second substrate (53) and a further, corresponding edge (b) of the first substrate (52) are preferably positioned relative to each other in such a manner that the further, corresponding edge (b) projects a further distance $d_2$ beyond the further edge (b') of the second substrate (53). The distances $d_1$ and/or $d_2$ are at least 0.1 mm and preferably at least 0.2 mm.

8 Claims, 4 Drawing Sheets

DISPLAY DEVICE

BACKGROUND OF THE INVENTION

The invention relates to a display device comprising a first and a second substrate between which a number of pixels arranged in rows and columns are situated, said first substrate comprising at least a group of electrodes for driving the pixels.

The above-mentioned display devices are used, for example, in television applications and data-graphic display devices. Examples of such display devices are liquid-crystal display devices (LCD, LC-TV and plasma-addressed LCD) and thin-type cathode ray tubes (CRT).

Display devices of the type mentioned in the opening paragraph are well known. An example of such a display device is disclosed in U.S. Pat. No. 5,323,254 (PHN 14.021), in which a description is given of a display device which can suitably be used to display information by means of electro-optical display media, such as liquid crystals, electrophoretic suspensions and electrochromic materials. The known display device comprises a system of pixels which are arranged in rows and columns, with (picture) electrodes, which are arranged on a substrate, corresponding with each pixel. Groups of electrodes are arranged on the substrate to present selection signals and data signals to the pixels.

Electrostatic charging or discharging may take place during the manufacture of substrates on which a group of electrodes is provided. A voltage difference may then develop between electrodes of the group of electrodes, such that breakdown occurs between these electrodes, which may cause damage to the electrodes. As a result of such damage, specific pixels or rows and/or columns of pixels can no longer be driven, which adversely affects the quality of the image displayed. Electric breakdown or flashover between the electrodes causes the display device to stop working. In general, damage and, consequently, non-operation as a result of electrostatic discharges is very costly if the manufacture of the display device is in an advanced stage.

In the known display device, damage caused by electrostatic discharges is precluded by providing a(n) (additional) switching element between electrodes of the group and supply lines for a reference voltage, said (additional) switching element consisting, for example, of diodes which are arranged in series.

A disadvantage of the known display device is that a large number of (additional) switching elements are required to reduce electrostatic discharging. Such (additional) switching elements increase the complexity of the construction and may themselves cause the device to stop working.

OBJECTS AND SUMMARY OF THE INVENTION

It is an object of the invention to provide a display device of the type mentioned in the opening paragraph, in which damage by electrostatic discharges is minimized in a simple manner.

This object is achieved by the display device in accordance with the invention, which is characterized in that electrodes of the group of electrodes extend as far as an edge of the first substrate and that the edge of the first substrate and a corresponding edge of the second substrate are positioned relative to each other in such a manner that the corresponding edge, viewed in a direction orthogonal to the substrates, projects a distance $d_1$ beyond the edge of the first substrate.

The inventors have recognized that a substantial part of the electrostatic discharges originate at the sides of the substrates, where the electrodes of the group of electrodes extend as far as the edge of the (first) substrate. A construction in which an edge of the first substrate on which electrodes are provided which extend as far as the edge of the first substrate, does not project beyond the corresponding edge of the second substrate, causes the side of the first substrate sensitive to electrostatic charging to be shielded by a corresponding side of the second substrate which, at said side, is insensitive to electrostatic charging or discharging. In other words, the side of the first substrate sensitive to electric charging is shielded by the projecting edge of the second substrate.

If at the proper side of the substrates the edge of the second substrate is made to project slightly beyond the corresponding edge of the first substrate, a clearly noticeable reduction of problems concerning (electric) breakdown or flashover between electrodes of the group of electrodes on the one substrate is achieved, which causes non-operation of the display device caused by electrostatic discharging to be reduced, without the necessity of (additional) switching elements. When the substrates are being made to size, small differences between corresponding edges of substrates may occur, for example, if the lines of fracture of oppositely located edges of the substrates extend in different directions.

An embodiment of the display device in accordance with the invention is characterized in that the distance $d_1$ is at least 0.1 mm.

If the edge of the second substrate, viewed in a direction at right angles to said substrate, projects more than 0.1 mm beyond the corresponding edge of the first substrate, which first substrate is provided with a group of electrodes which extend as far as the edge of the first substrate, a substantial safety margin is obtained for a minor difference in direction, between the lines of fracture, which causes the direction of the edge of the first substrate to differ from the direction of the edge of the second substrate. Said difference in direction is to be understood to mean in this context that the oppositely located or corresponding edges of the substrates do not extend parallel to each other.

A preferred embodiment of the display device in accordance with the invention is characterized in that the distance $d_1$, is at least 0.2 mm.

During the manufacture of display devices, the substrates are aligned relative to each other and/or they are brought to the desired size after they have been interconnected. Inaccuracies during aligning and/or sizing of the substrates leads to a variation in the positioning of the fracture-edges of the substrates with respect to each other. If the edge of the second substrate, viewed in a direction orthogonal to the substrate, projects more than 0.2 mm beyond the edge of the first substrate, which first substrate is provided with electrodes which extend as far as the edge of the first substrate, the inaccuracies during aligning or sizing of the substrates are sufficiently compensated for.

A further preferred embodiment of the display device in accordance with the invention, in which the display device comprises, on the second substrate, at least a further group of electrodes for driving the pixels, is characterized in that electrodes of the further group of electrodes extend as far as a further edge of the second substrate and that the further edge of the second substrate and a further, corresponding edge of the first substrate are positioned relative to each other in such a manner that the further, corresponding edge, viewed in a direction orthogonal to the substrates, projects a further distance $d_2$ beyond the further edge of the second substrate.

In the display device, generally, one substrate is provided with column electrodes and the other substrate is provided with row electrodes, which electrodes, viewed in a direction orthogonal to the substrates, are oriented orthogonal with respect to each other, thereby forming a matrix array for driving the pixels. This means that on one substrate electrodes extend as far as an edge of the substrate and on the other substrate electrodes extend as far as an edge of said other substrate, said edges, viewed in a direction orthogonal to the substrates, being situated on two different sides of the display device. By ensuring, during aligning and/or sizing of the substrates, that on both sides of the display device the edge of one substrate, viewed in a direction orthogonal to the substrates, projects beyond the corresponding edge of the other substrate, the electrodes of which extend as far as the edge, both edges of the substrates, which are sensitive to electrostatic charging or discharging, are protected by the projecting edges of the oppositely located substrates. By virtue thereof, a situation is attained in which both the above-mentioned sides of the display device are insensitive to electrostatic charging or discharging.

This results in a situation in which, on the sides of the display device which do not serve to make connections for presenting selection signals and data signals to the pixels, the first substrate projects beyond the second substrate on a side of the display device, while on a further side of the display device, the second substrate projects beyond the first substrate. In a display device comprising an active plate and a passive plate, the invention can be summarized as follows: the passive plate is slightly withdrawn on the column side and the active plate is slightly withdrawn on the row side.

These and other aspects of the invention will be apparent from and elucidated with reference to the embodiments described hereinafter.

BRIEF DESCRIPTION OF THE DRAWINGS

In the drawings.

The Figures are purely schematic and not drawn to scale. In particular for clarity, some dimensions are exaggerated strongly. In the Figures, like reference numerals refer to like parts, whenever possible.

DESCRIPTION OF THE PREFERRED EMBODIMENTS

Figure 1:
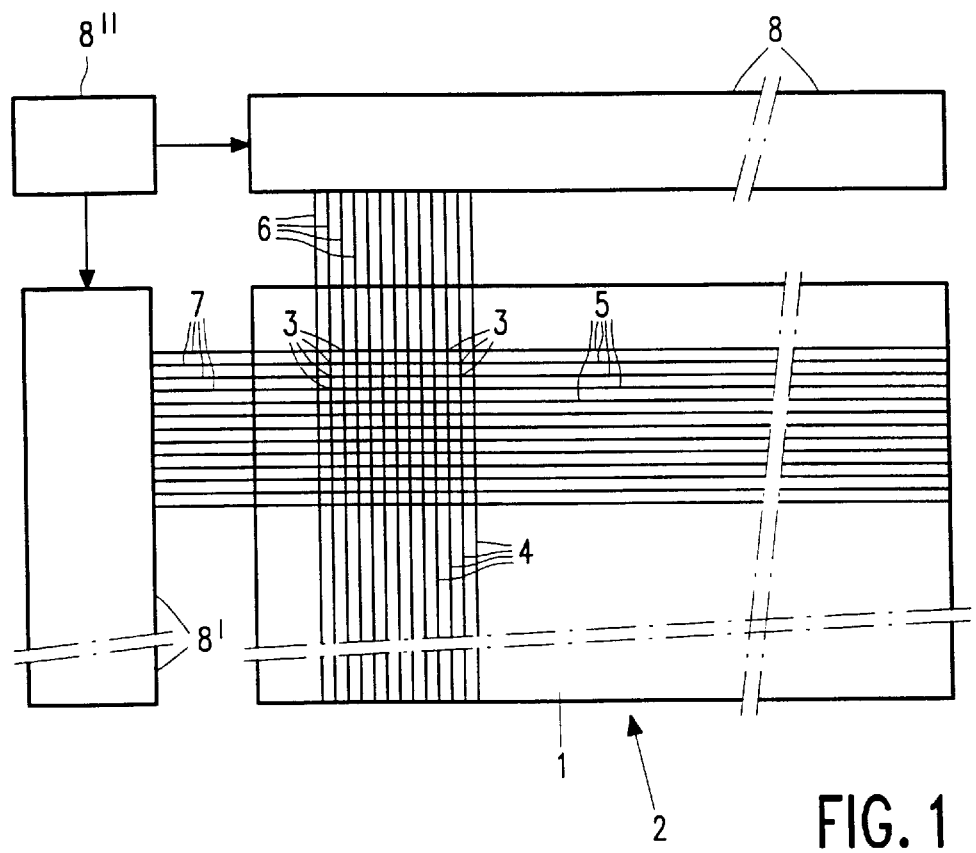
FIG. 1 is a schematic block diagram of a conventional, thin-type display device.

FIG. 1 is a very schematic block diagram of a conventional thin-type display device. Said display device comprises a substrate 1 having a surface 2 provided with a pattern of pixels which are at a predetermined distance from each other in the vertical and horizontal directions. Each pixel 3 comprises overlapping parts of thin, narrow electrodes 4 of a group of electrodes, which electrodes are arranged in vertical columns, and thin, narrow electrodes 5 of a further group of electrodes, which electrodes are arranged in horizontal rows. The electrodes 4 of the group of electrodes are also referred to as column electrodes, and the electrodes 5 of the further group of electrodes are also referred to as row electrodes. In a plasma-addressed liquid-crystal display device (PALC), the rows are formed by long, narrow channels. The pixels 3 in each one of the rows of electrodes (channels) 5 represent a data line.

The width of the electrodes 4, 5 determines the dimensions of the pixels 3, which typically are rectangular. Electrodes 4 receive (analog) drive signals ("data drive signals") from a drive circuit 8 via parallel conductors ("output conductors") 6, and electrodes 5 receive (analog) drive signals ("data drive signals") from a drive circuit 8' via parallel conductors ("output conductors") 7.

To produce an image or a data-graphic display on a relevant area of the surface 2 of substrate 1, the display device employs a control circuit ("scan control circuit") 8", which drives the drive circuits 8, 8'. In the display device use can be made of various types of electro-optical materials. If, for example, use is made of a material which changes the polarization state of incident light, the display device is arranged between a pair of filters which change the polarization of (visible) light. If use is made of a liquid-crystal material which scatters light in a diffuse manner, polarizers are redundant. In general, the electro-optical materials weaken the transmitted or reflected light in response to a voltage applied across the material.

Figure 2A:
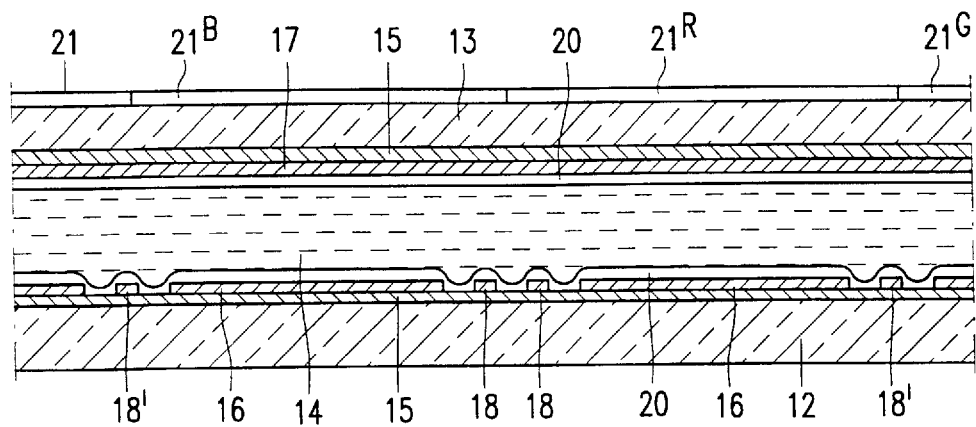
FIG. 2A is a schematic cross-sectional view of a liquid-crystal display device (LCD), taken on the line II—II in FIG. 2B.
Figure 2B:
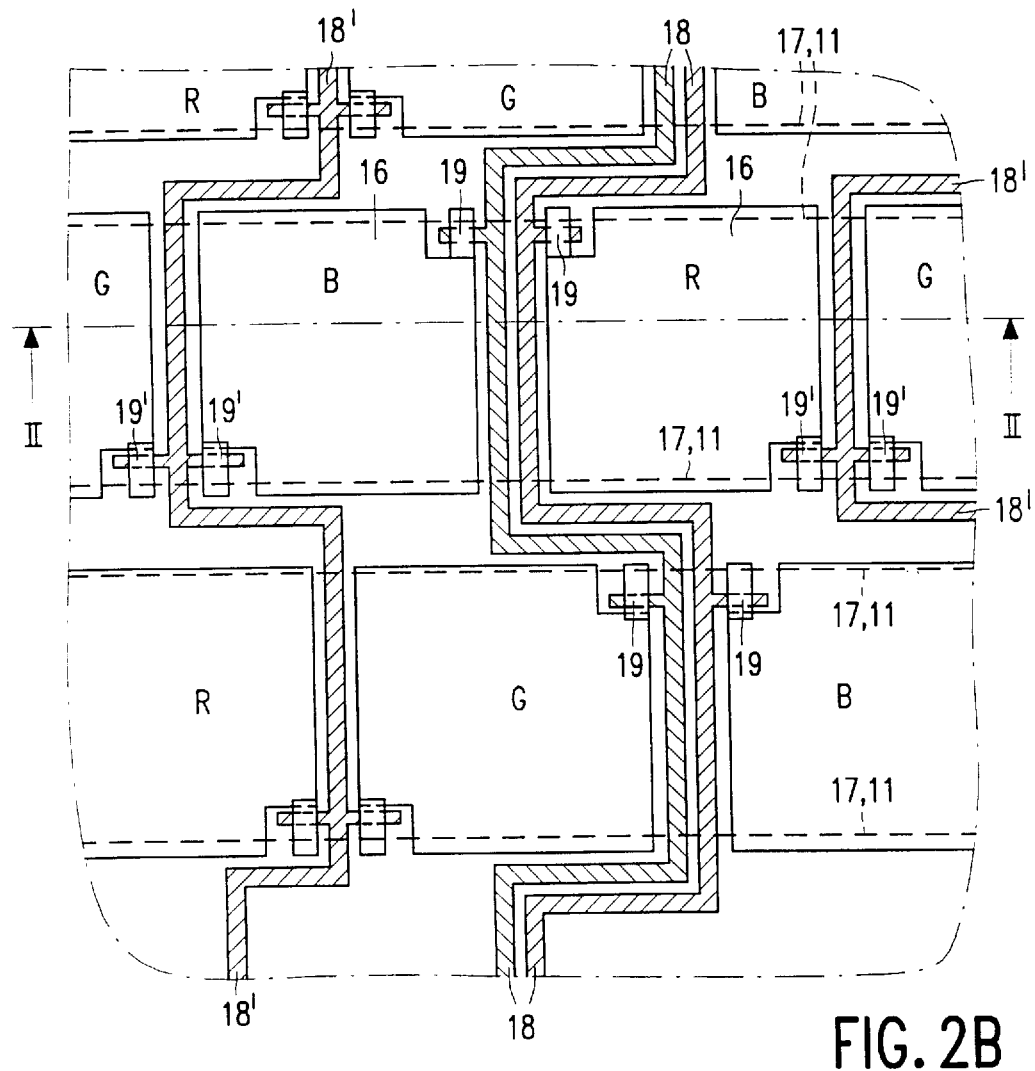
FIG. 2B is a schematic plan view of the display device shown in FIG. 2A.

FIGS. 2A and 2B schematically show a cross-sectional view and a plan view, respectively, of a part of a display device, in this example a liquid-crystal display device (LCD), which comprises a first substrate 12 and a second substrate 13 between which, for example, a twisted-nematic or ferro-electric liquid-crystalline material 14 is sandwiched. The inner surfaces of the substrates 12 and 13 are provided with electrically insulating and chemically inert layers 15. On the first substrate 12, there is provided a number of picture electrodes 16 of indium-tin oxide (ITO) or another electroconductive, transparent material, which picture electrodes are arranged in rows and columns. Said second substrate 13 is also provided with transparent picture electrodes 17, for example, of ITO, which are integrated to form strip-shaped row electrodes 11. The facing picture electrodes 16, 17 form the pixels of the display device.

In a color display device, the pixels correspond with color elements of a color filter. In the example shown in FIG. 2A, a color filter 21 with color elements 21R, 21G and 21B is present on the second substrate 13. Column electrodes 18 (which are made, for example, of metal) are provided between the columns of the picture electrodes 16. Each picture electrode 16 is connected to a column electrode 18 by a switching element, in this example a diode 19 which is schematically shown in FIG. 2A. The inner surfaces of the substrates 12 and 13 are further provided with liquid-crystal orienting layers 20. As is known, the state of orientation of the liquid-crystal molecules and hence the optical state, can be changed by applying a voltage across the liquid-crystal layer 14. The display device can be either a transmissive device or a reflective device, and it may be provided with one or two polarizers. Between the columns of picture electrodes 16 there are also auxiliary electrodes 18', which in this embodiment are common to two picture electrodes 16 and which are situated at the side of the picture electrodes 16 where there are no column electrodes 18. The auxiliary electrodes 18' connect the picture electrodes 16 with each other via other switching elements, in this example diodes 19' with a reference voltage, which are schematically shown in FIG. 2B. This reference voltage is chosen to be such that, dependent upon the voltages used on the selection line 11 and the electro-optical material used, the capacitance associated with the picture element can always be discharged via the diode 19' to a voltage value outside or on the edge of the transition area in the transmission/voltage characteristic of the relevant electro-optical material.

During the manufacture of substrates on which a group of electrodes is provided, electrostatic charging or discharging may take place. A voltage difference then develops between electrodes of the group of electrodes, such that between the electrodes breakdown takes place, which may cause damage to the conductive tracks which form the electrodes. As a result of such damage, certain pixels or rows and/or columns of pixels can no longer be driven, so that the quality of the image displayed is adversely affected. Electric breakdown or flashover between the electrodes generally causes the display device to stop working. Electrostatic charging or discharging may also occur during the manufacture of a first substrate on which switching elements are situated (the so-called "active plates"). A voltage difference between (column) electrodes may then occur, such that breakdown occurs between these electrodes and switching elements become damaged. The risk of damage as a result of breakdown also applies to other switching elements. Electrostatic breakdown may further occur between the row electrodes on the second substrate (the so-called "passive plate") or between the row electrodes which, dependent upon the type of switching element used (two-pole or three-pole), are provided on the same substrate or on the other substrate.

In a further stage of manufacture, when the first and the second substrate (the active plate and the passive plate) have been joined and an electro-optical medium, such as a liquid-crystal material, is present between the substrates, breakdown between a row and a column may also occur due to (excessively high) electrostatic voltages by which the switching element or a component of a pixel may be damaged. For example, degradation of the liquid-crystalline material may also occur. In general, damage and, consequently, non-operation as a result of electrostatic discharges is very costly if the manufacture of the display device is in an advanced stage. In this application, a switching element is to be understood to mean a two-pole switching element as well as a three-pole switching element. Two-pole switching elements include, for example, non-linear switching elements, such as MIMs, diodes or varistors, but also linear switching elements. Three-pole switching elements include, for example, TFTs.

Figure 3:
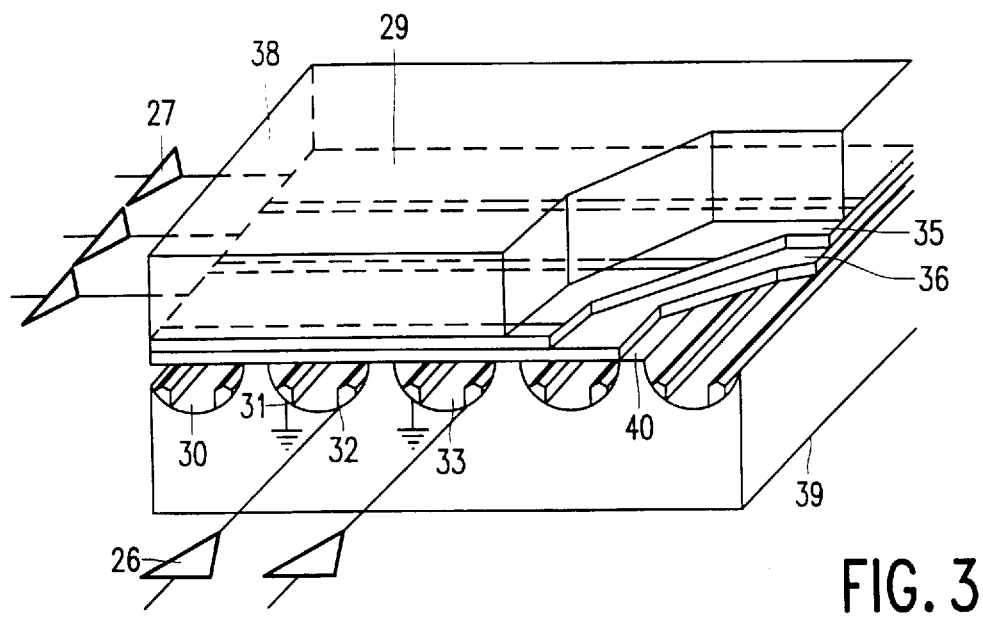
FIG. 3 is a schematic perspective view, partly cut away, of a part of a construction of a conventional plasma-addressed liquid-crystal display device (PALC)

FIG. 3 is a schematic, perspective view, partly cut away, of a part of a construction of a conventional plasma-addressed liquid-crystal display device (PALC), in which only three column electrodes 29 are shown. The row electrodes 30 are formed by a number of parallel, elongated channels ("parallel elongated sealed channels") under a layer 35 of an electro-optical material. Each one of the (plasma) channels 30 is filled with an ionizable gas 33 and sealed by a thin dielectric layer 36, which is for example made of glass, and each of said channels is provided on an inner surface ("interior channel surface") with first and second elongated electrodes ("spaced elongated electrodes") 31, 32, which extend throughout the length of each channel. The second electrode 32 is referred to as the anode and is supplied with a "strobe pulse", with electrons, emitted by the cathode 31, ionizing the gas, thereby forming a plasma. When the "strobe pulse" ends and the gas is de-ionized, the next channel is ignited/invoked. As the column electrodes 29 each intersect an entire column of pixels, only one plasma-row connection per unit of time is possible so as to preclude crosstalk.

A PALC display device is generally manufactured in the following manner. The ITO column electrodes 29 are vapor-deposited on a first substrate 38, which is made, for example, of glass, whereafter, in a color display device, color elements of a color filter (not shown in FIG. 3) are provided, which color elements coincide with the pixels. The second substrate 39, which is generally also a glass plate, is provided (for example by masking and etching) with channels 30, whereafter a plasma-electrode material is deposited, after which (via masking and etching) the cathode electrodes 31 and the anode electrodes 32 are formed. A thin, dielectric (glass) "micro sheet" 36 is connected to the channel edges 40 to seal off the channels 30. Subsequently, the channels are evacuated, filled with a low-pressure ionizable gas, such as helium, neon and, if desirable, argon, whereafter they are sealed off. After aligning the substrates and the electro-optical material, the panel is provided with electric connections to the column electrodes 29 and the anode plasma generating electrodes 32, 33, said column-electrodes 29 receiving (analog) drive signals ("data drive signals") from output amplifiers 27 and the anode electrodes 32 in the (plasma) channels 30 receiving drive signals ("data strobe signals") from output amplifiers 26.

Figure 4A:
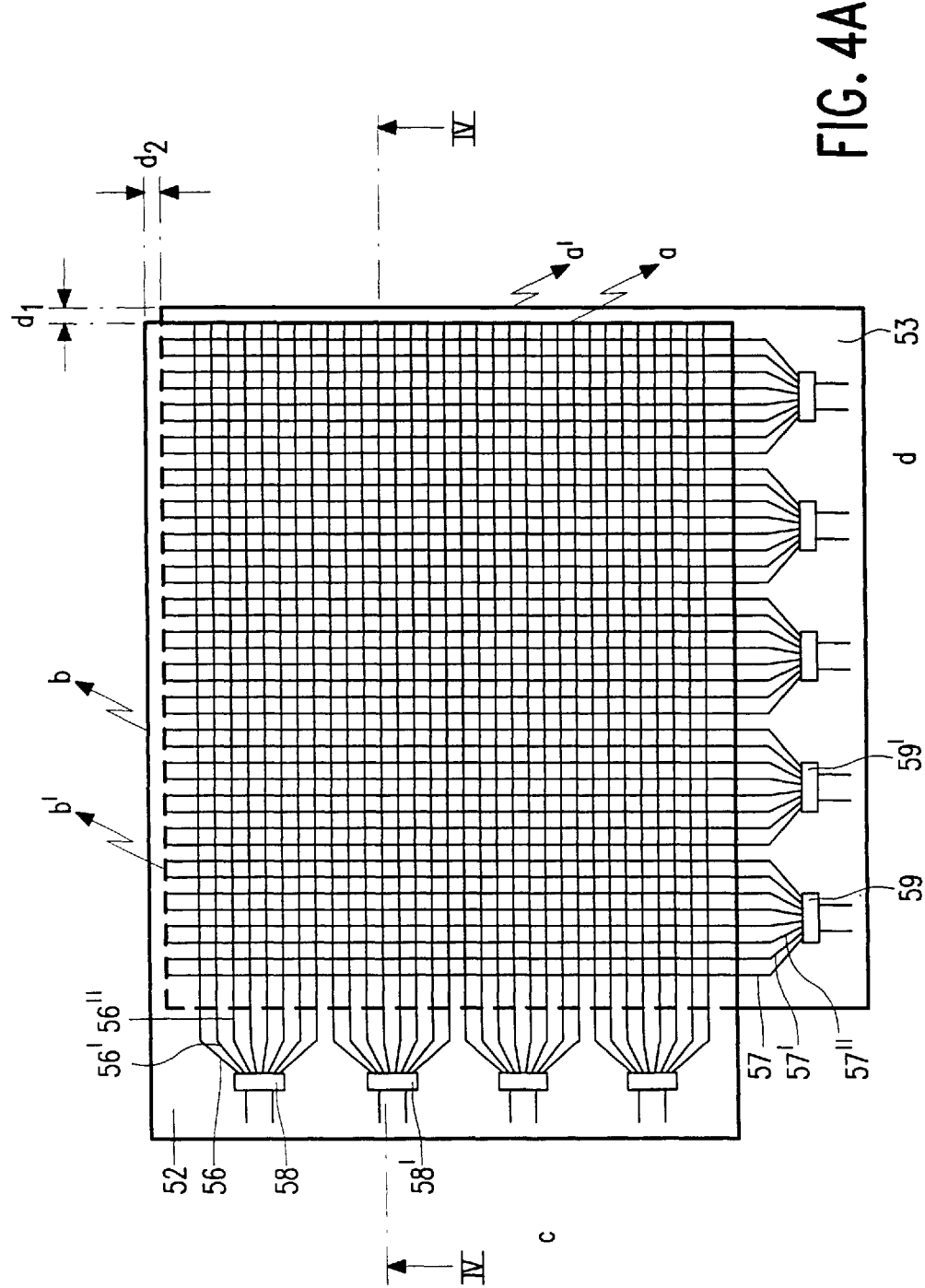
FIG. 4A is a schematic plan view of a liquid-crystal display device (LCD) in accordance with the invention, taken on the line IV—IV in FIG. 4B.
Figure 4B:
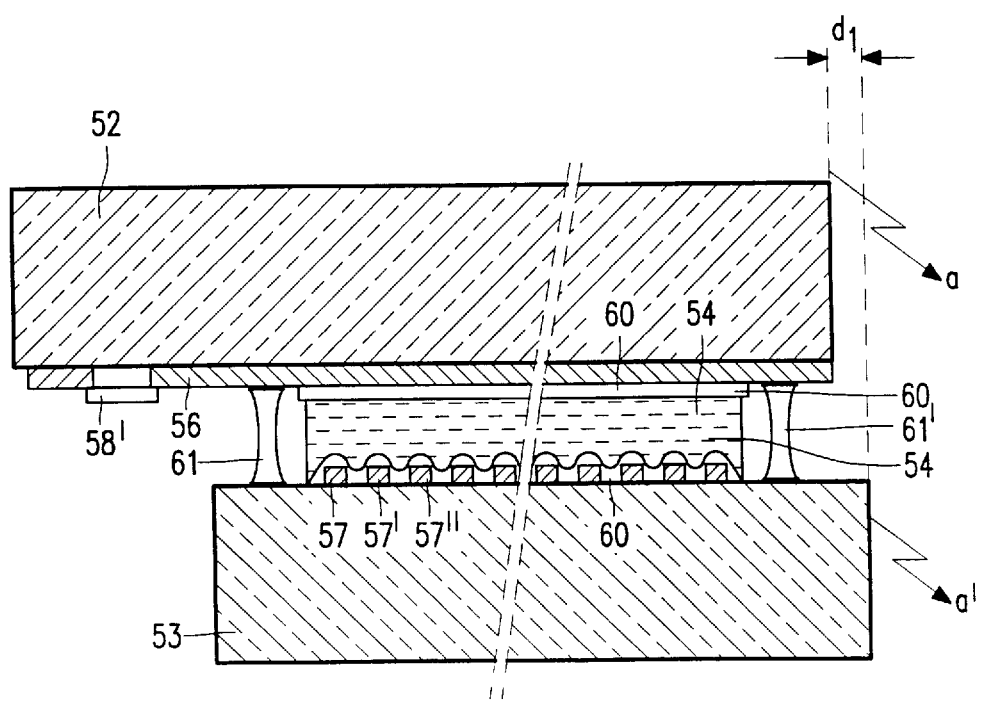
FIG. 4B is a schematic cross-sectional view of the display device shown in FIG. 4A.

FIGS. 4A and 4B are a schematic plan view and a schematic cross-sectional view, respectively, of a part of a display device in accordance with the invention, in this example a liquid-crystal display device (LCD), which comprises a first substrate 52 and a second substrate 53 between which, for example, a twisted nematic or ferro-electric liquid-crystalline material 54 is sandwiched. The inner surfaces of the substrates 52 and 53 are provided with electrically insulating and chemically inert layers (not shown in FIG. 4B). The first substrate 52 is provided with a number of picture electrodes 56, 56', 56", etc., which are arranged in rows and which are made of an electroconductive, transparent material (for example ITO). The second substrate 53 is provided with transparent picture electrodes 57, 57', 57", etc., which are arranged in columns and which are made, for example, of ITO. The opposing picture electrodes 56, 56', 56", etc., and 57, 57', 57", etc., form the pixels of the display device. The substrates 52, 53 are interconnected via intermediate walls 61, 61'. The inner surfaces of the first and the second substrates 52, 53 are further provided with liquid-crystal, orienting layers 60. To produce an image or a data-graphic display on a relevant area of the display device, said display device employs control circuits ("scan control circuits") 58, 58', etc., and 59, 59', etc. In a color display device, the pixels coincide with color elements of a color filter (not shown in FIG. 4B).

In the example shown in FIG. 4A, the four sides of the display device are referenced a, b, c and d. On side c, the first substrate 52 projects beyond the second substrate 53, whereas on side d the second substrate 53 projects beyond the first substrate 52.

The projecting sides c, d, on which the control circuits 58, 58', etc., and 59, 59', etc., are situated, serve to make the connections necessary for presenting selection signals and data signals to the pixels.

As regards the sides of the display device which are referenced a, a' and b, b' in FIG. 4A, the row electrodes 56, 56', 56", etc., on the first substrate 52 extend, on side a, a', as far as the edge a of the first substrate 52, while, on side b, b', the column electrodes 57, 57', 57", etc., on the second substrate 53 extend as far as edge b' of the second substrate 53. By constructing the display device in accordance with the invention in such a manner that on side a, a', the edge a' of the second substrate 53 projects (distance $d_1$,) beyond the edge a of the first substrate 52, it is achieved that the electrodes at the edge a of the first substrate 52 can no longer be touched directly, so that the risk of electrostatic charging or discharging is structurally reduced. In addition, at the location of the end portions of the row electrodes 56, 56', 56", etc., a concentration of field lines on the edge a of the first substrate 52 does not occur. In an equivalent situation, the edge b of the first substrate 52 projects, on side b, b' of the display device, beyond the edge b' of the second substrate 53 (distance $d_2$) and also the electrodes at the edge b' of the second substrate 53 can no longer be touched directly, so that the risk of electrostatic charging or discharging is structurally reduced.

By causing the edge a' of the second substrate 53 to project on the side a, a' of the display device beyond the edge a' of the first substrate 52 (distance $d_1$) and by also causing the edge b of the first substrate 52 to project on the side b, b' of the display device beyond the edge b' of the second substrate 53 (distance $d_2$), an effective protection against electrostatic charging is attained on both sides a, a' and b, b' of the display device. Thus, both sides a, a' and b, b' of the substrates 52, 53, which are sensitive to electrostatic charging, are shielded by a side of opposing substrates, which, on said sides, are insensitive to electrostatic charging or discharging.

During the manufacture of display devices, the substrates are aligned relative to each other and/or the substrates are brought to the desired size after they have been joined. For example, after the first and the second substrate have been joined, end portions are cut from each of the substrates by means of, for example, a so-called "scribe/break process", in which the desired shape of the display device is attained. In general, one side of the first substrate, viewed in a direction orthogonal to the substrate, projects beyond the second substrate and a (nearby) side of the second substrate projects beyond the first substrate, said projecting sides of the first and second substrates in the display device generally being orthogonal to each other, and said projecting sides being used to make connections so that selection signals and data signals can be presented to the pixels. As regards the remaining (two) sides of each of the substrates, in general, the aim is to make the fracture-edges, viewed in a direction orthogonal to the substrate, coincide as much as possible. Due to inaccuracies in the "scribe/break process", however, the fracture-edges of the substrate are not exactly the same. In general, this means that the fracture-edge of one of the two substrates projects (partly) beyond the fracture-edge of the other substrate. If a first substrate, which is provided with electrodes of a group of electrodes which extend as far as an edge of the first substrate, projects beyond the second substrate, these electrodes at said edge can easily be touched and hence are (extra) sensitive to electrostatic charging or discharging. Despite preventive measures, such as careful "handling", by using, for example, special transport means (tweezers) or so-called "ionization blowers", the risk of electrostatic discharging cannot be structurally reduced by means of said measures. Inaccuracies in aligning and/or sizing of the substrates cause a variation in the positioning of the fracture-edges of the substrates relative to each other.

In a preferred embodiment, $d_1$ and $d_2$ are larger than 0.1 mm, preferably larger than 0.2 mm. In the case of a breakdown voltage in air of approximately 2 kV/mm, the voltage necessary to bring about breakdown between electrodes when the distance between the edges of the displaced substrates is 0.2 mm is approximately 500 V higher than the voltage that would be necessary when the edges overlap exactly.

It will be obvious that within the scope of the invention many variations are possible to those skilled in the art.

In general, the invention relates to a display device comprising a first and a second substrate between which a number of pixels arranged in rows and columns are situated, and said first and second substrates are provided with a group of electrodes for driving the pixels. The display device is characterized in that electrodes of the group of electrodes extend as far as an edge of the first substrate, and that the edge of the first substrate and a corresponding edge of a second substrate are positioned relative to each other such that the corresponding edge projects a distance $d_1$ beyond the edge of the first substrate. If electrodes of a further group of electrodes extend as far as a further edge of the second substrate, said further edge of the second substrate and a further, corresponding edge of the first substrate are preferably positioned relative to each other in such a manner that the further, corresponding edge projects a further distance $d_2$ beyond the further edge of the second substrate. The distances $d_1$ and/or $d_2$ are at least 0.1 mm and preferably at least 0.2 mm.

I claim:

1. A display device comprising a first and a second substrate (52, 53) between which a number of pixels arranged in rows and columns are situated, said first substrate (52) comprising at least a group of electrodes (56, 56', 56") for driving the pixels, characterized in that electrodes of the group of electrodes (56, 56', 56") extend as far as an edge (a) of the first substrate (52) and that the edge (a) of the first substrate (52) and a corresponding edge (a') of the second substrate (53) are positioned relative to each other in such a manner that the corresponding edge (a'), viewed in a direction orthogonal to the substrates (52, 53), projects a distance ($d_1$) beyond the edge (a) of the first substrate (52).

2. A display device as claimed in claim 1, characterized in that the distance ($d_1$) is at least 0.1 mm.

3. A display device as claimed in claim 1, characterized in that the distance ($d_1$) is at least 0.2 mm.

4. A display device as claimed in claim 1, wherein the display device comprises, on the second substrate (53), at least a further group of electrodes (57, 57', 57") for driving the pixels, characterized in that electrodes of the further group of electrodes (57, 57', 57") extend as far as a further edge (b') of the second substrate (53) and that the further edge (b') of the second substrate (53) and a further, corresponding edge (b) of the first substrate (52) are positioned relative to each other in such a manner that the further, corresponding edge (b), viewed in a direction orthogonal to the substrates, projects a further distance ($d_2$) beyond the further edge (b') of the second substrate (53).

5. A display device as claimed in claim 4, characterized in that the further distance ($d_2$) is at least 0.1 mm.

6. A display device as claimed in claim 4, characterized in that the further distance ($d_2$) is at least 0.2 mm.

7. A display device as claimed in claim 1, characterized in that the display device comprises an electro-optical medium (54) between the substrates.

8. A display device as claimed in claim 7, characterized in that the display device further comprises parallel plasma channels (30) for switching the electro-optical medium (35).

* * * * *